(12) United States Patent
Martin et al.

(10) Patent No.: US 7,219,139 B2
(45) Date of Patent: May 15, 2007

(54) SYSTEM AND METHOD FOR USING CONTINUOUS MESSAGING UNITS IN A NETWORK ARCHITECTURE

(75) Inventors: Anthony G. Martin, Los Altos, CA (US); Eugene Veteska, San Jose, CA (US)

(73) Assignee: Claria Corporation, Redwood City, CA (US)

( * ) Notice: Subject to any disclaimer, the term of this patent is extended or adjusted under 35 U.S.C. 154(b) by 678 days.

(21) Appl. No.: 10/174,403

(22) Filed: Jun. 17, 2002

(65) Prior Publication Data
US 2003/0005067 A1    Jan. 2, 2003

Related U.S. Application Data

(60) Provisional application No. 60/301,888, filed on Jun. 29, 2001.

(51) Int. Cl.
G06F 15/16 (2006.01)

(52) U.S. Cl. .................................. 709/219; 709/227

(58) Field of Classification Search ........ 709/204–206, 709/217–219; 705/14, 26
See application file for complete search history.

(56) References Cited

U.S. PATENT DOCUMENTS

| | | | |
|---|---|---|---|
| 5,446,919 A | | 8/1995 | Wilkins |
| 5,481,741 A | * | 1/1996 | McKaskle et al. .......... 345/522 |
| 5,608,850 A | * | 3/1997 | Robertson ................... 345/427 |
| 5,617,526 A | * | 4/1997 | Oran et al. .................. 715/779 |
| 5,675,510 A | | 10/1997 | Coffey et al. |
| 5,717,923 A | | 2/1998 | Dedrick |
| 5,734,863 A | * | 3/1998 | Kodosky et al. ............. 703/27 |
| 5,796,952 A | | 8/1998 | Davis et al. |
| 5,848,396 A | | 12/1998 | Gerace |
| 5,898,434 A | | 4/1999 | Small et al. |
| 5,901,287 A | | 5/1999 | Bull et al. |
| 5,933,811 A | | 8/1999 | Angles et al. |
| 5,991,735 A | | 11/1999 | Gerace |

(Continued)

FOREIGN PATENT DOCUMENTS

WO    WO 01/03028    1/2001

(Continued)

OTHER PUBLICATIONS

Kourbatov, Opening a Window, Jul. 8, 2000, plublished by www.javascripter.net, whole document.*

*Primary Examiner*—David Wiley
*Assistant Examiner*—Joseph E. Avellino
(74) *Attorney, Agent, or Firm*—Joseph E. Root; Haynes Beffel & Wolfeld (57) ABSTRACT

The present invention provides techniques for selectively distributing messages to viewers. Specific embodiments provide systems, methods, apparatus and computer program products for distributing messages to viewers based upon information about potential viewers. In specific embodiments, targeted messages are made available to the client machines in response to client message requests by a server that takes the machine and/or user ID provided as part of the client request and queries the database to see if there are any messages pending for that user or that match that user's profile. Specific embodiments can provide a plurality of messages coupled together to form a campaign. The client can receive the campaign using available bandwidth unused by foreground applications, such as web browsers and the like.

21 Claims, 6 Drawing Sheets

U.S. PATENT DOCUMENTS

| | | | |
|---|---|---|---|
| 6,006,252 A * | 12/1999 | Wolfe | 709/217 |
| 6,009,410 A | 12/1999 | LeMole et al. | |
| 6,026,368 A | 2/2000 | Brown et al. | |
| 6,029,141 A | 2/2000 | Bezos et al. | |
| 6,029,195 A | 2/2000 | Herz | |
| 6,088,731 A | 7/2000 | Kiraly et al. | |
| 6,108,637 A | 8/2000 | Blumenau | |
| 6,115,680 A | 9/2000 | Coffee et al. | |
| 6,134,532 A | 10/2000 | Lazarus et al. | |
| 6,138,155 A | 10/2000 | Davis et al. | |
| 6,141,010 A * | 10/2000 | Hoyle | 715/854 |
| 6,183,366 B1 | 2/2001 | Goldberg et al. | |
| 6,237,022 B1 * | 5/2001 | Bruck et al. | 709/201 |
| 6,266,058 B1 * | 7/2001 | Meyer | 715/733 |
| 6,286,043 B1 | 9/2001 | Cuomo et al. | |
| 6,297,819 B1 | 10/2001 | Furst | |
| 6,314,451 B1 | 11/2001 | Landsman et al. | |
| 6,317,761 B1 | 11/2001 | Landsman et al. | |
| 6,332,127 B1 * | 12/2001 | Bandera et al. | 705/14 |
| 6,334,111 B1 | 12/2001 | Carrott | |
| 6,336,131 B1 | 1/2002 | Wolfe | |
| 6,341,305 B2 * | 1/2002 | Wolfe | 709/203 |
| 6,347,398 B1 | 2/2002 | Parthasarathy et al. | |
| 6,381,742 B2 | 4/2002 | Forbes et al. | |
| 6,418,471 B1 | 7/2002 | Shelton et al. | |
| 6,434,745 B1 | 8/2002 | Conley, Jr. et al. | |
| 6,438,215 B1 | 8/2002 | Skladman et al. | |
| 6,442,529 B1 | 8/2002 | Krishan et al. | |
| 6,446,128 B1 | 9/2002 | Woods et al. | |
| 6,460,036 B1 * | 10/2002 | Herz | 707/10 |
| 6,477,575 B1 * | 11/2002 | Koeppel et al. | 709/206 |
| 6,539,375 B2 | 3/2003 | Kawasaki | |
| 6,567,854 B1 * | 5/2003 | Olshansky et al. | 709/229 |
| 6,570,595 B2 * | 5/2003 | Porter | 715/802 |
| 6,601,057 B1 * | 7/2003 | Underwood et al. | 707/1 |
| 6,643,696 B2 | 11/2003 | Davis et al. | |
| 6,691,106 B1 | 2/2004 | Sathyanarayan | |
| 6,697,825 B1 * | 2/2004 | Underwood et al. | 715/530 |
| 6,714,975 B1 * | 3/2004 | Aggarwal et al. | 709/224 |
| 6,760,746 B1 * | 7/2004 | Schneider | 709/203 |
| 6,763,379 B1 | 7/2004 | Shuster | |
| 6,763,386 B2 | 7/2004 | Davis et al. | |
| 6,785,659 B1 * | 8/2004 | Landsman et al. | 705/14 |
| 6,827,669 B2 * | 12/2004 | Cohen et al. | 482/8 |
| 6,848,004 B1 * | 1/2005 | Chang et al. | 709/232 |
| 6,880,123 B1 * | 4/2005 | Landsman et al. | 715/500.1 |
| 6,892,223 B1 * | 5/2005 | Kawabata et al. | 709/213 |
| 6,892,354 B1 * | 5/2005 | Servan-Schreiber et al. | 715/733 |
| 7,043,526 B1 | 5/2006 | Wolfe | |
| 7,054,900 B1 | 5/2006 | Goldston | |
| 2001/0030970 A1 * | 10/2001 | Wiryaman et al. | 370/401 |
| 2001/0037240 A1 | 11/2001 | Marks et al. | |
| 2001/0049320 A1 | 12/2001 | Cohen et al. | 482/8 |
| 2001/0049321 A1 * | 12/2001 | Cohen et al. | 482/8 |
| 2001/0049716 A1 | 12/2001 | Wolfe | |
| 2001/0051559 A1 * | 12/2001 | Cohen et al. | 482/8 |
| 2001/0053735 A1 * | 12/2001 | Cohen et al. | 482/902 |
| 2002/0016736 A1 * | 2/2002 | Cannon et al. | 705/14 |
| 2002/0042750 A1 * | 4/2002 | Morrison | 705/26 |
| 2002/0059094 A1 * | 5/2002 | Hosea et al. | 705/10 |
| 2002/0059099 A1 | 5/2002 | Coletta | |
| 2002/0068500 A1 * | 6/2002 | Gabai et al. | 446/176 |
| 2002/0077219 A1 * | 6/2002 | Cohen et al. | 482/8 |
| 2002/0091700 A1 * | 7/2002 | Steele et al. | 707/100 |
| 2002/0128904 A1 * | 9/2002 | Carruthers et al. | 705/14 |
| 2003/0023698 A1 * | 1/2003 | Dieberger et al. | 709/217 |
| 2004/0167928 A1 | 8/2004 | Anderson et al. | |

FOREIGN PATENT DOCUMENTS

| | | |
|---|---|---|
| WO | WO 01/15052 | 3/2001 |
| WO | WO 01/39024 | 5/2001 |
| WO | WO 01/90917 A2 | 11/2001 |

* cited by examiner

SYSTEM AND METHOD FOR USING CONTINUOUS MESSAGING UNITS IN A NETWORK ARCHITECTURE

CROSS REFERENCE TO RELATED APPLICATIONS

This application claims benefit of U.S. Provisional Application No. 60/301,888, entitled "SYSTEM AND METHOD FOR USING CONTINUOUS MESSAGING UNITS IN A NETWORK ARCHITECTURE," filed on Jun. 29, 2001 and which is incorporated herein by reference in its entirety. U.S. application Ser. No. 10/057,413, entitled "SYSTEM, METHOD AND COMPUTER PROGRAM PRODUCT FOR PRESENTING INFORMATION TO A USER UTILIZING HISTORICAL INFORMATION ABOUT THE USER," filed Jan. 25, 2002 also claims the benefit of U.S. Provisional Application No. 60/301,888.

FIELD OF THE INVENTION

This invention relates to computer technology, and more particularly but not exclusively, relates to presenting information in a computer network environment.

BACKGROUND OF THE INVENTION

The Internet is a wide area network of interconnected computers which employs a client-server model. The Internet includes server computers which may be accessed by client computers. Typically, a server hosts a site on the Internet which includes a collection of files or pages. The network address of a server is typically specified by a Uniform Resource Locator (URL). A user may access the servers from a client via the Internet through an Internet service provider (ISP). By utilizing a browser application on the client, the user can connect to or "link" to a particular server based upon the URL address of that server.

The Internet computer network was originally designed as a communications link to facilitate the exchange of scientific information between governmental laboratories and educational institutions. However, in recent years, the increased use of the World Wide Web (WWW) has fueled explosive growth of the Internet that has extended beyond the scientific community and, indeed, into homes, businesses and classrooms. The WWW refers to a collection of Internet servers that typically utilize Hypertext Transfer Protocol (HTTP) as an applications protocol to provide users with access to files for communicating text, graphics, sound, video, etc. HTTP, in turn, may use a page description language called Hypertext Markup Language (HTML) to specify the format of web pages that are displayed to the users. HTML pages can include hypertext links to other servers and files, with the URL's of the target servers stored or embedded within the links.

Links present in a web page may appear to a user in a variety of forms. For example, a link may appear as underlined text, as bolded text, as text having a different color as surrounding text, or as text having some other form designed to draw the attention of the user such that the link is easily identified as such. When a user selects a link (e.g., by "clicking" on the link with an input device such as a computer mouse), the browser makes a Transmission Control Protocol/Internet Protocol (TCP/IP) request to the server identified by the URL specified in the link, and receives a web page from the identified server. A link may also be embedded within a graphical image displayed on the user's computer monitor or display. When the geographical area of the image is selected by the user, the browser again makes an TCP/IP request to the server identified by the specified URL. Thus, a user may navigate (i.e., "surf") between various servers to find and retrieve HTML pages or documents of interest.

As use of the Internet has become more pervasive, merchants have looked to the Internet as providing a new advertising medium for their products and services. Merchants who sponsor their own web sites typically include advertising material within their site's pages. However, creating and maintaining a stand-alone web site can require a substantial amount of resources and may be beyond the means of many merchants. Also, the time and expense required to set up such a stand-alone site makes this technique unsuitable for certain seasonal, limited time, or one-shot usage. Further, the audience for this advertising material may be limited by the extent to which the merchant can attract users to visit its own site.

A technique that has been used to address these problems is the deployment of advertisements on the web sites of other sponsors or content providers who agree to sponsor the advertisements. A simple advertisement suitable for such deployment takes the form of a graphical banner. Such a banner includes an image related to the product or service being advertised, typically stored as a graphics file (e.g., a ".gif" file), and displayed according to the HTML description of the sponsoring page. A merchant is often required to pay a sponsor of the particular web site an advertising fee for the privilege of deploying its banner on the sponsor's site. The banner may also be widely distributed or deployed on many sites. However, typical advertising banners involve only one-way communication, and do not take advantage of the Internet's interactive capabilities which could otherwise be used to solicit data from prospective customers or users for generating purchase orders or leads.

To provide demographically-targeted advertising, the advertiser or distributor of the advertising may seek to obtain demographic data on its end users. A common way to acquire demographic data regarding users via the Internet is to request the information using a form written in HTML provided to the user utilizing the Internet. Demographic information obtained this way is often difficult to obtain because users are often unmotivated to fill in forms with information when they do not know who will view the information or for what purpose the information will be used.

What is needed are improved techniques for selectively distributing messages to viewers.

SUMMARY OF THE INVENTION

The present invention provides techniques for selectively distributing messages to viewers. Specific embodiments provide systems, methods, apparatus and computer program products for distributing messages to viewers based upon information about potential viewers. In specific embodiments, targeted messages are made available to the client machines in response to client message requests by a server that takes the machine and/or user ID provided as part of the client request and queries the database to see if there are any messages pending for that user or that match that user's profile. Specific embodiments can provide a plurality of messages coupled together to form a campaign. The client can receive the campaign using available bandwidth unused by foreground applications, such as web browsers and the like.

In a representative embodiment, the present invention provides a method for displaying information to a user. The method can comprise a variety of steps. For example, a step of detecting occurrence of an event indicating a message is to be displayed by a first application on a client can be part of the method. Further, a step of retrieving content for a first message from a repository at a content server is included in the method. Further, a step of initiating selection of one or more messages to be displayed based upon behavioral information collected and analyzed at the client is also included. Finally, a step of monitoring activity at the client for an opportunity to display a selected message can be performed in accordance with the method.

Numerous benefits are achieved by way of the present invention over conventional techniques. Specific embodiments according to the present invention provide capability to identify an audience as narrow or as broad as needed by particular applications. The benefit is that the cost of serving ads (especially larger rich media ads) is dramatically lower than first generation ad networks with their centralized architecture These and other benefits are described throughout the present specification. A further understanding of the nature and advantages of the invention herein may be realized by reference to the remaining portions of the specification and the attached drawings.

DETAILED DESCRIPTION

The present invention provides techniques for selectively distributing messages to viewers. Specific embodiments provide systems, methods, apparatus and computer program products for distributing messages to viewers based upon information about potential viewers. In specific embodiments, targeted messages are made available to the client machines in response to client message requests by a server that takes the machine and/or user ID provided as part of the client request and queries the database to see if there are any messages pending for that user or that match that user's profile. Specific embodiments can provide a plurality of messages coupled together to form a campaign. The client can receive the campaign using available bandwidth unused by foreground applications, such as web browsers and the like.

Figure 1A:
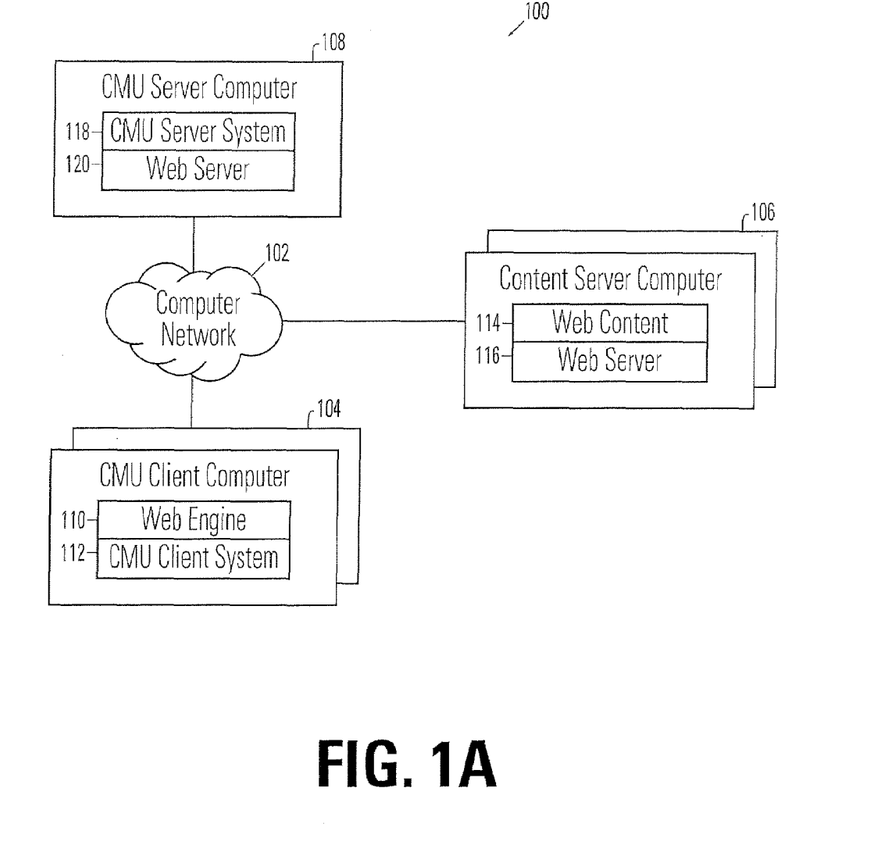
FIG. 1A is a schematic diagram of a computer network framework for a network messaging system in accordance with an embodiment of the present invention.

Because first generation ad networks have a centralized architecture, content (e.g., advertisements) is typically distributed from central servers to a user's browser every time an ad is displayed. Thus, the same ad is distributed from the server several (even millions or billions) of times. The network message system of the present invention allows for more efficiency than such prior art systems. The architecture of the network message system of the present invention may also allow for more flexibility than is possible with server-only ad servers including:

FIG. 1A is a schematic diagram of a computer network framework 100 for a CMU network system in accordance with an embodiment of the present invention. A network 102, such as for example, a client-server network, a wide area network (e.g., the Internet), or the like, couples together one or more CMU client computers 104, one or more content server computers 106, and one or more CMU server computers 108.

CMU client computer 104 may be any type of computer that provides an end-user access to a network. In one embodiment, CMU client computer 104 may be a personal computer running on operating system such as for example, the Microsoft Windows™, Apple Macintosh™, Linux, or UNIX operating systems. CMU client computer 104 may also include a web engine 110, which can comprise a web browser such as the Microsoft Internet Explorer™ or Netscape Navigator™ in specific embodiments. An end-user utilizing CMU client computer 104 employs web engine 110 for accessing information and web pages stored on various web sites (e.g., content server computers 106) coupled to the network 102. CMU client computer 104 may also include a CMU client system 112 for receiving, processing, and displaying various CMUs received via the network.

Content server computer 106 may include web content 114 and a web server 116. As can be appreciated by those skilled in the art, such a content server computer 106 and other server computers in the specific embodiments of the present invention, may be implemented using any appropriately configured computer including, for example server computers available from Sun Microsystems™, the Hewlett-Packard Company™, or International Business Machines™. Web content 114 may include any information accessible via the network, including web pages and the like. In one embodiment, web content 114 may be of the type generally available over the Internet for browsing. For example, a web page of the present invention may include an HTML (HyperText Markup Language) file containing news, maps, coupons, offer for services, directories, for sale merchandize, and other types of information that will attract end-users to the content server computer 106. The web server 116 may include program code that allows the content server computer 106 to be in communication with the network 102.

The CMU server computer 108 may be any type of computer comprising a web server 120 that is capable of serving information for presentation/display by the CMU client computer 104. The information may include information of any type, such as, for example, advertising information. CMU server computer 108 may also include a CMU server system 118, which is in communication with the network 102.

Figure 1B:
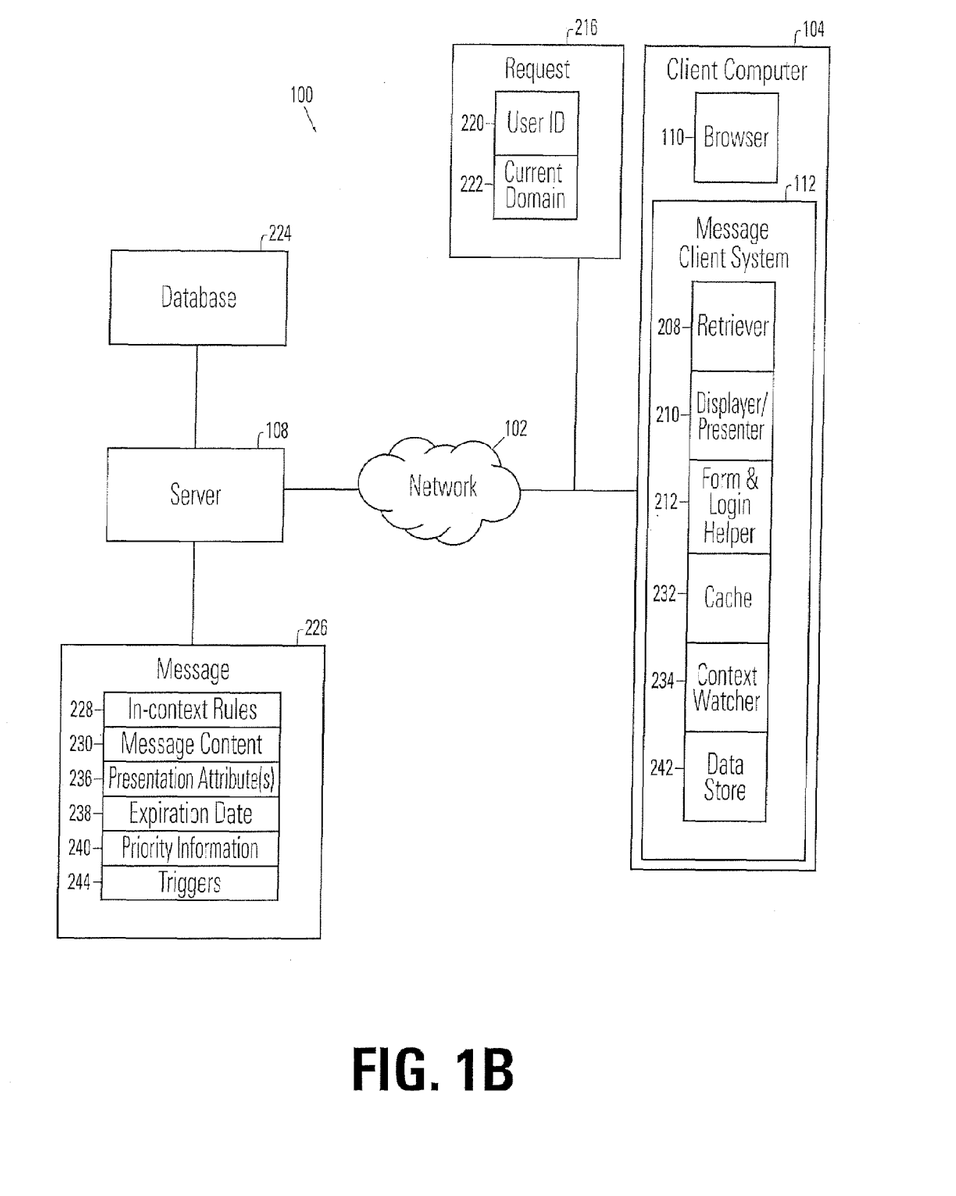
FIG. 1B is a schematic diagram of an illustrative network message system in accordance with an embodiment of the present invention.

FIG. 1B is a schematic diagram of an illustrative network message system in accordance with an embodiment of the present invention. The network message system may be utilized for retrieving and displaying messages to users based on a user's current context and past behavior. It should be understood that in the present description, the various sub-components of each of the components may also be considered components of the framework. For example, particular software modules executed on any component of the system may also be considered components of the system. Installed and running on a CMU client computer 104 coupled to a network 102 (e.g., the Internet) is a CMU client system 112. The CMU client system 112 may comprise a plurality of components including a retriever 208, a displayer 210, a form and login helper 212.

As the user accesses sites coupled to the network 102 (commonly known as "surfing the Internet") utilizing a web engine 110 (e.g., an Internet browser such as Microsoft Internet Explorer) installed and running on the CMU client computer 104, from one site or domain (e.g., www.yahoo.com) to another (e.g., www.amazon.com), the retriever 208 sends a request 216 to a CMU server computer 108 via the network 102. The request 216 may contain at least two pieces of information: a unique customer ID of the user (i.e., a user ID) 220 and a current domain being entered by the user (i.e., a machine ID) 222.

The CMU server computer 108 receives the request 216 from the retriever 208 and performs a check to determine if there are any messages pending for the specified domain 222. If it is determined that there are messages associated with the specified domain, then the CMU server computer 108 queries an historical-based targeting database 224 to determine if there are any specific messages pending for this domain 222 for this specific user 220. If there are, then the specific message(s) 226 is returned to the retriever 208 on the user's CMU client computer 104.

It should be noted that in one embodiment, that the message(s) 226 may include two components: a block of in-context rules 228 and the content 230 that makes up the portion of the message presented to the user. The in-context rules 228 may dictate the circumstances in which the message content 230 is displayed to the user. Some illustrative examples of some in-context rules include: (1) domains at which the retrieved messages should be presented to the user; (2) specific web pages at which the retrieved messages should be presented to the user; (3) URL substrings that, should they be found in the current URL, will cause the message to be presented; and (4) time and date information.

Also, the rules 228 may include/reference almost any kind of relevant information, such as, for example, specific known attributes about the user like frequent flyer affiliation, club memberships, type of credit card used, hobbies and interests, basic demographic information (gender, age, income, etc.). The content 230 may also include standard HTML, including text, images, figures, colors, etc., sound files that will automatically play upon display of the message, and other types of multi-media files/content.

Upon receiving the message 226 from the CMU server computer 108, the retriever 208 may store the message in a local cache 232 for subsequent presentation. As the user continues to surf from page to page, a context watcher 234 may examine the user's context (e.g., URL, date/time, etc.) and look for messages stored in the local cache 232 with in-context rules that match. Upon a match being found, the displayer 210 or the form and login helper 212 present for display the matching message.

In one embodiment, the message cache 232 may buffer messages received from message system server 108. This enables the client computer 104 to have several messages at any given time. For example, the message cache 232 may contain a message relating to a current web site or web page the user is visiting and additional messages relating to similar web sites or web pages. As an illustration, the message cache 232 may contain a message relating to books when the end-user is browsing the catalog of an on-line bookstore, and additional messages relating to movies that may also be available from that on-line bookstore. This way, a message relating to movies can be routed to the appropriate presentation format module as soon as the user navigates to a movies-related web page.

In one embodiment, the displayer 210 may open an independent window on a visual display coupled to the user (i.e., the user's screen) that presents/displays the message content 230. As another option, the message content 230 may be presented in a small window that is appended to the form and login helper 212. The specific vehicle to use may be identified as an attribute 236 embedded in the message 226 and selected during creation of the message.

As an option, the message 226 may include one or more expiration dates 238 that may be used to ensure that a message is not presented after the appropriate time/date. This date 238 may also be monitored by the cache 232 and used to remove expired messages from the client machine. As a further option, the message may also include priority information 240 that may be used when to determine the priority of the message over other messages that are to be presented to the user.

In another embodiment, messages 226 may be available on the CMU server computer 108 that are to be presented to any user that satisfies the appropriate context rule 228. Such messages may then be delivered to the CMU client computer 104 by the retriever 208 without requiring matching historical-based profile in the targeting database 224. In one embodiment, the client computer 104 and/or the server 108 may include a data store 242 of user preferences, profile and historical information about the user for use in determining whether a rule has been satisfied.

In an embodiment of the present invention, the network message system may be utilized to deliver various messages/content such as, for example, Internet banner advertising technology. The following portions of the specification discuss various components that may be utilized in the network message system in accordance with embodiments of the present invention.

As previously mentioned, a message for the network message system may include two parts or portions: (1) a rules file 228 and (2) content/media 230 for presentation. The rules file 228 may contain the information utilized by the client to determine when and where to display the associated content/media. Some illustrative rule file attributes may include: the type of message; a list of the media and sizes for the particular message; timing information (beginning and ending dates, frequency information, etc.); triggers that indicate where the campaign should be started; and triggers that indicate where the content should be displayed.

The content/media 230 for presentation may comprise Hypertext Markup Language (HTML), image, and/or other types of multi-media files. In one embodiment, the content may also include one or more industry-standard image files representing a display size currently used for banners. However, it should be understood that the content need not be limited to standard image files and may include various types of rich media (Flash, video, audio, etc.).

A message campaign, or flight of messages, may be activated on a client based on the tripping of one of the specified triggers. In other words, the messages may not be presented until one of the specified triggers is hit (unless modeling and/or with historical targeting is utilized). In one embodiment, a set of triggers may be defined as a set of Uniform Resource Locators (URL's). The set of URL's may also be combined with search strings. In particular, URL masks may be used for working with search engine queries. For example, there is a standard search URL template for use with the Yahoo search engine. A user may insert a key word of interest (like "Laser" or "Sony" or "DVD") into this template to define a trigger.

A trigger is tripped when the user navigates to a page that maps to one of the trigger rules. As an option, no trigger may need to be tripped in an embodiment of the present invention where historical targeting and/or modeling is utilized to present messages and content to a user. In general, a trigger is a condition that, when satisfied, instructs client system 112 to take an action (such as, for example, show a message to the user). One type of trigger may be a URL. When the URL of interest is observed, the specified action is taken. When a trigger is tripped, the content for a first message specified in the rule file is retrieved from a message server and the message campaign is activated. One way to look at this activation trigger list is to view it as a mechanism for doing "real time targeting." In other words, users may be selected and targeted for message campaigns based on specific behaviors, without necessarily having had the corresponding behavioral information sent to the message server for processing. This allows fast response to observed behaviors of the user. This approach also may be useful for tightening privacy policy so that detailed behavioral information (including navigation information) does not have to be transmitted via a network to the message server. Once the media to be presented has been retrieved, the client may begin to determine when to present the message.

In one embodiment, a client may present a message when all of following criteria have been met: (1) when the message campaign has been activated (as described above); (2) when the client detects an HTML image (which may also be referred to as the original image) request for an image with a size matching that of the message client system; (3) the server's domain name from which the original image is being requested is not included in an exclude list of the message server system; (4) the domain of the current web page is included either in a specified global domain inclusion list or on a private domain inclusion list of the message; and/or (5) the domain of the current web page is not on a private domain exclusion list of the message.

Figure 2:
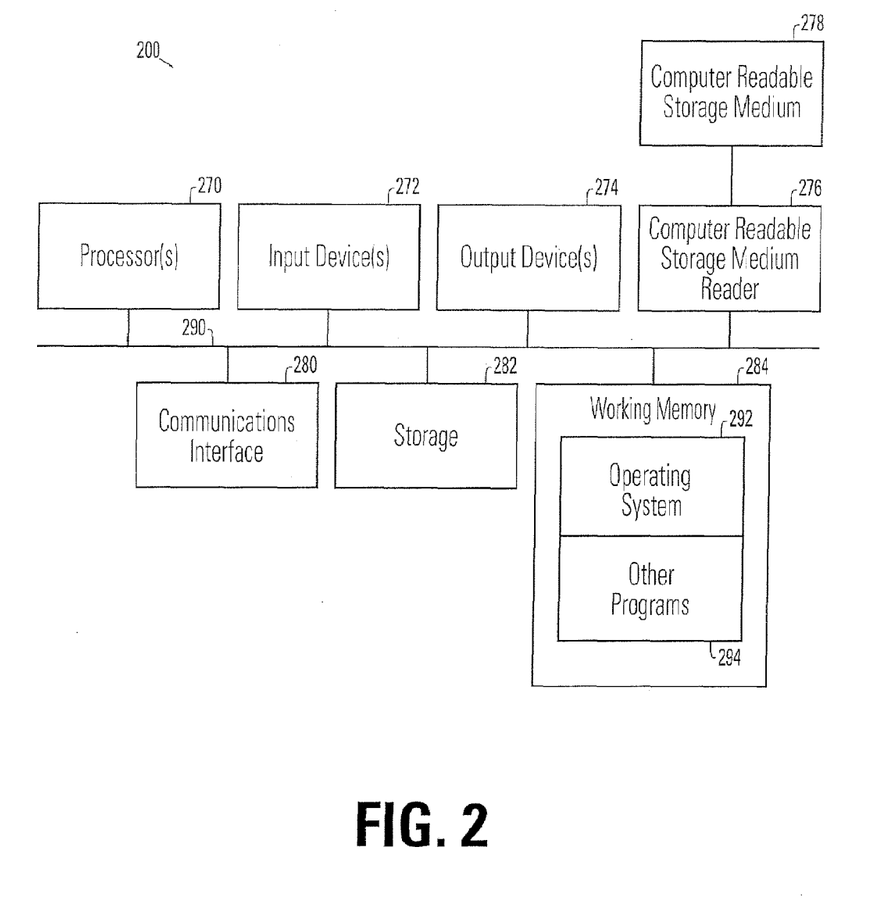
FIG. 2 is a schematic diagram of a representative hardware environment in accordance with an embodiment of the present invention.

FIG. 2 illustrates a block diagram of a representative computer system in a specific embodiment of the present invention. As illustrated by FIG. 2, a computing system 200 can embody one or more of the elements illustrated by FIG. 2 in various specific embodiments of the present invention. While other application-specific alternatives might be utilized, it will be presumed for clarity sake that the elements comprising the computer system 200 are implemented in hardware, software or some combination thereof by one or more processing systems consistent therewith, unless otherwise indicated.

Computer system 200 comprises elements coupled via communication channels (e.g. bus 290) including one or more general or special purpose processors 270, such as a Pentium® or Power PC®, digital signal processor ("DSP"), and the like. System 200 elements also include one or more input devices 272 (such as a mouse, keyboard, microphone, pen, and the like), and one or more output devices 274, such as a suitable display, speakers, actuators, and the like, in accordance with a particular application. System 200 also includes a computer readable storage media reader 276 coupled to a computer readable storage medium 278, such as a storage/memory device or hard or removable storage/memory media; such devices or media are further indicated separately as storage device 282 and memory 284, which can include hard disk variants, floppy/compact disk variants, digital versatile disk ("DVD") variants, smart cards, read only memory, random access memory, cache memory, and the like, in accordance with a particular application. One or more suitable communication interfaces 280 can also be included, such as a modem, DSL, infrared or other suitable transceiver, and the like for providing inter-device communication directly or via one or more suitable private or public networks that can include but are not limited to those already discussed.

Working memory 284 further includes operating system ("OS") elements 292 and other programs 294, such as application programs, mobile code, data, and the like for implementing system 200 elements that might be stored or loaded therein during use. The particular OS can vary in accordance with a particular device, features or other aspects in accordance with a particular application (e.g. Windows, Mac, Linux, Unix or Palm OS variants, a proprietary OS, and the like). Various programming languages or other tools can also be utilized, such as known by those skilled in the art. As will be discussed, embodiments can also include a network client such as a browser or email client, e.g. as produced by Netscape, Microsoft or others, a mobile code executor such as a Java Virtual Machine ("JVM"), and an application program interface ("API"), such as a Microsoft Windows compatible API. (Embodiments might also be implemented in conjunction with a resident application or combination of mobile code and resident application components.)

One or more system 200 elements can also be implemented in hardware, software or a suitable combination. When implemented in software (e.g. as an application program, object, downloadable servlet, and the like in whole or part), a system 200 element can be communicated transitionally or more persistently from local or remote storage to memory (or cache memory, and the like) for execution, or another suitable mechanism can be utilized, and elements can be implemented in compiled or interpretive form. Input, intermediate or resulting data or functional elements can further reside more transitionally or more persistently in a storage media, cache or more persistent volatile or non-volatile memory, (e.g. storage device 282 or memory 284) in accordance with a particular application.

Figure 3:
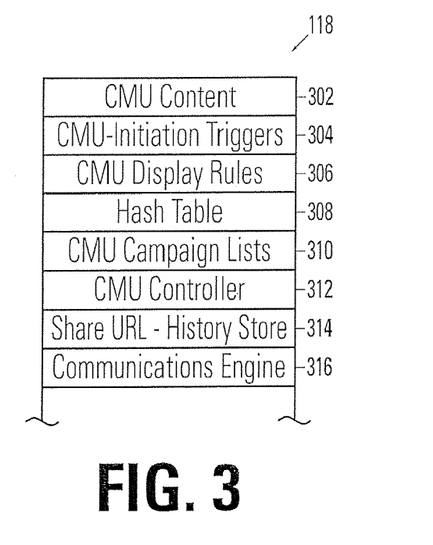
FIG. 3 is a schematic diagram of an illustrative Continuous Messaging Unit (CMU) server system in accordance with an embodiment of the present invention.

FIG. 3 is a schematic diagram of various functional aspects of an illustrative CMU server system 118 in accordance with an embodiment of the present invention. The functional blocks of the CMU server system 118 illustrated by FIG. 3 can be implemented in hardware, software or a suitable combination, thereof. In specific embodiments, the CMU server system 118 comprises CMU content 302, CMU initiation triggers 304, CMU display rules 306, a hash table 308, CMU campaign list(s) 310, a CMU controller 312, a shared URL history store 314, and a communication engine 316. Other functional aspects may also be included in the CMU server system 118 in some embodiments. Further, not all specific embodiments will include each functional aspect depicted by FIG. 3.

In specific embodiments, CMU content 302 comprises a variety of content that can be used to craft the message(s) 226. Content 302 can include advertising information, coupons, calls-to-action, images, multimedia objects, and the like. CMU initiation triggers 304 comprise a variety of triggering events that can be detected to initiate detection of a context appropriate for displaying a message 226. In specific embodiments, the triggers can be URLs of web pages, for example. CMU display rules 306 provide information on a variety of contexts that can be sensed for and, when detected, initiate the display of a message 226.

As described herein above, message(s) 226 include two components: a block of in-context rules 228 and the content 230 that makes up the portion of the message presented to the user. Accordingly, the message(s) 226 may be built by the CMU server system 118 using the CMU content 302 and the CMU display rules 306. The in-context rules 228, which dictate the circumstances in which the message content 230 is displayed to the user, can be drawn from the CMU display rules 306. Some illustrative examples of some rules include: (1) domains at which the retrieved messages should be presented to the user; (2) specific web pages at which the retrieved messages should be presented to the user; (3) URL substrings that, should they be found in the current URL, will cause the message to be presented; and (4) time and date information. Also, the CMU display rules 306 may include/reference almost any kind of relevant information, such as, for example, specific known attributes about the user like frequent flyer affiliation, club memberships, type of credit card used, hobbies and interests, basic demographic information (gender, age, income, etc.). The content 302 may also include standard HTML, including text, images, figures, colors, etc., sound files that will automatically play upon display of the message, and other types of multi-media files/content.

The hash table 308 enables minimization of unproductive server requests as will be described in further detail with reference to FIG. 5 below.

The CMU campaign list(s) 310 provides a repository for storing campaigns, or flights of messages. A message campaign may be activated on a client based on the tripping of one of the specified triggers associated with the campaign. A system administrator or other authorized user can define message campaigns to the system for storage in the CMU campaign list 310. The campaigns can be sent to targeted users' client machines in accordance with specific embodiments of the present invention.

The CMU server 118 also includes a shared URL history store 314. In some embodiments, users may be targeted to receive CMUs based on their historical profile. Historical-based targeting can be used to select users based on behaviors and/or attributes. For example, users may be selected based upon navigation behavior, including domains visited, number of pages viewed, time spent at sites, etc. This behavior can also include the viewing of any previously tagged page using a "blind trigger." A blind trigger is created by setting triggers for pages to be tracked without the user seeing any activity (hence the word "blind"). For example, say it is desirable to know how many people bought something at FOO.com. Accordingly, a blind trigger is set to observe navigations to the receipt page. The number of times the user visits can be totaled over the period of time for which the blind trigger is set. In specific embodiments, the user would not see any feedback that this is occurring. Other historical targeting factors include a ZIP code, a click-through frequency on previously viewed coupons/messages, an affiliate ID code or type of a co-brand, a number of weeks for which user has been active, and the like.

The CMU server 118 further includes a communication engine 316 that provides communications with one or more CMU client computers 104 over the network 102. The CMU controller 312 coordinates the activities of each of the component processes within the CMU server system 118.

Figure 4:
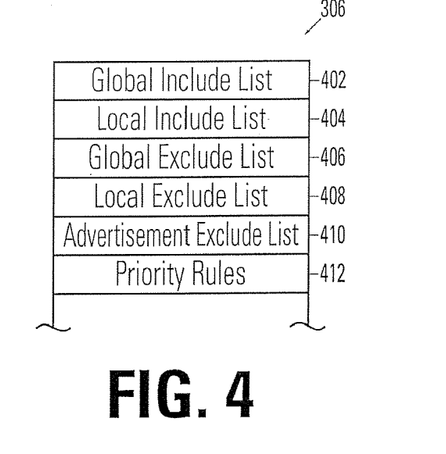
FIG. 4 is a schematic diagram of representative display rules in accordance with an embodiment of the present invention.

FIG. 4 is a schematic diagram of representative display rules in accordance with an embodiment of the present invention. CMU display rules 306 can be used to control the presentation, timing and organization of messages, including advertising, at the CMU client computer 104. CMU display rules 306 includes a global include list 402. The global include list 402 provides sites for which all campaigns may be displayed. A local include list 404 provides sites for which specific campaigns may be displayed. A global exclude list 406 provides sites for which no campaigns may be displayed. A local exclude list 408 provides sites for which specific campaigns may not be displayed. An advertisement exclude list 410 identifies advertisers over who's advertisements CMUs will not display. Finally, priority rules 412 may be used in cases where multiple campaigns are triggered to determine the priority of display for the campaigns.

The client will display a campaign when all of the following criteria have been met: (1) It has been activated as described above; (2) The client observes an HTML image (referred to as the original image) request for an image that is compatible with that of the campaign (i.e., same size, etc.); (3) The server's domain name from which the original image is being requested is not on the ad server exclude list 410; (4) The domain of the current web page is on either the specified global domain inclusion list 402 or on the CMU's private domain inclusion list 404; (5) The domain of the current web page is not on the CMU's private domain exclusion list 408. Other aspects controlling display of messages may also be included in the CMU display rules 306 in some embodiments. Further, not all specific embodiments will include each functional aspect depicted by FIG. 4.

Figure 5:
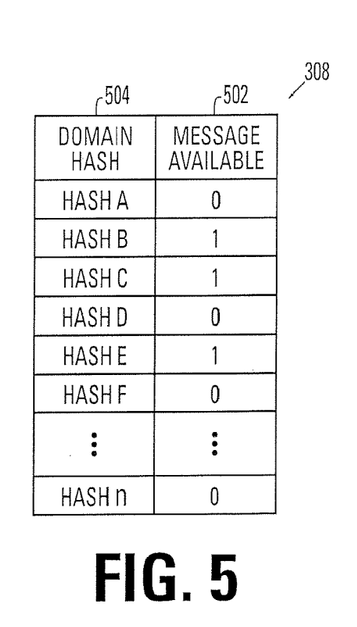
FIG. 5 is a schematic diagram of an illustrative hash table in accordance with an embodiment of the present invention.

FIG. 5 is a schematic diagram of an illustrative hash table 308 in accordance with an embodiment of the present invention. A client initiates requests for messages as the user enters Internet domains utilizing an Internet browser running on the client. In one embodiment, minimization of unproductive server requests may be accomplished through the use of the client hash table 308. In such an embodiment, the hash table may provide the information needed for the client to determine whether or not messages are available 502 for use at a given domain 504. In other words, the client may first look up a domain in the hash table before transmitting a request to the server via the network. In one embodiment, server requests may be made for those domains that have an entry in the hash table. Also, each client may also periodically check (i.e., transmit a server request) for an updated version of the hash table.

Once the client has established that there are messages available for the current domain, the client may then make a request to the server for the available message units. Information included in this request may includes: (1) a machine ID identifying the client machine; (2) a user ID identifying the user; (3) the local time; (4) a domain for which the messages are being requested; and (5) a list of the locally cached messages previously retrieved for this domain—each entry in this list may also include the message ID and version number.

In response to the server request, the client receives a list of rule files to retrieve from the rule file store 306 of the CMU server system 118. The client may then retrieve each of those files in the list.

Once a rule file has been retrieved from the server 118, the client may then make a request to retrieve the content for the first image in the content list. As an option, when retrieving large content files such as, for example, certain types of rich media, the content may be transmitted to the client via a trickling process that consumes relatively little ongoing bandwidth.

As the user navigates to each web page utilizing an Internet browser, the client may take the current URL and look for trigger matches in the list of locally cached rule files. When a match is found, the client may then present the previously fetched content. In one embodiment, if more than one match is found, then the message with the highest priority may be chosen. After presenting the message content, the client may check to see if there are other content/images associated with the current message's rule file. If so, the next image in the list may then be retrieved and cached locally. This content/image may then be presented when the next qualifying trigger situation is observed.

Figure 6:
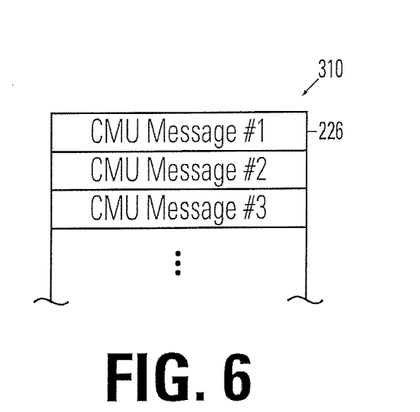
FIG. 6 is a schematic diagram of an illustrative campaign list in accordance with an embodiment of the present invention.

FIG. 6 is a schematic diagram of an illustrative campaign list in accordance with an embodiment of the present invention. A plurality of messages can be stored in the CMU campaign list(s) 310 as shown by FIG. 6. A message campaign 226 may be activated on a client based on the tripping of one of the specified triggers associated with the campaign. A system administrator or other authorized user can define message campaigns to the system for storage in the CMU campaign list 310. The campaigns can be sent to targeted user's client machines in accordance with specific embodiments of the present invention.

Figure 7:
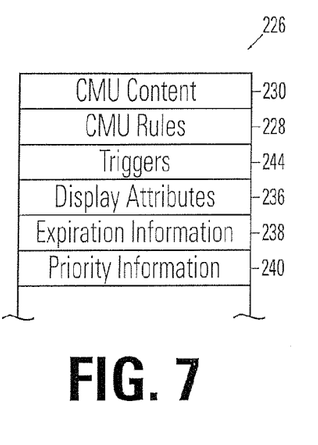
FIG. 7 is a schematic diagram of representative CMU message in accordance with an embodiment of the present invention.

FIG. 7 is a schematic diagram of representative CMU message in accordance with an embodiment of the present invention. As previously mentioned, a message for the network message system may include: (1) a rules file and (2) content/media for presentation. In one specific embodiment illustrated by FIG. 7, the message 226 comprises content 230, which makes up the portion of the message presented to the user and CMU display rules 228, which may dictate the circumstances in which the message content 230 is displayed to the user. In specific embodiments, message 226 can also include optional expiration information 238 and optional priority information 240.

The content 230 may include Hypertext Markup Language (HTML), text, images, figures, colors, sound files that will automatically play upon display of the message, and other types of multi-media files/content. In one embodiment, the content may also include one or more industry-standard image files representing a display size currently used for banners. However, it should be understood that the content 230 need not be limited to standard image files and may include various types of rich media, such as Flash, video, audio, and the like.

Some illustrative examples of some rules 228 include: (1) domains at which the retrieved messages should be presented to the user; (2) specific web pages at which the retrieved messages should be presented to the user; (3) URL substrings that, should they be found in the current URL, will cause the message to be presented; and (4) time and date information. Also, the rules 228 may include/reference almost any kind of relevant information, such as, for example, specific known attributes about the user like frequent flyer affiliation, club memberships, type of credit card used, hobbies and interests, basic demographic information, such as gender, age, income, and the like. The message 226 may contain the information utilized by the client to determine when and where to display the associated content/media, called display attributes 236. Additional illustrative rules 228 include: the type of message; a list of the media and sizes for the particular message; timing information, such as beginning and ending dates, frequency information, and the like. Triggers 244 can indicate where the campaign should be started, called initiation triggers, and triggers that indicate where the content should be displayed.

Figure 8:
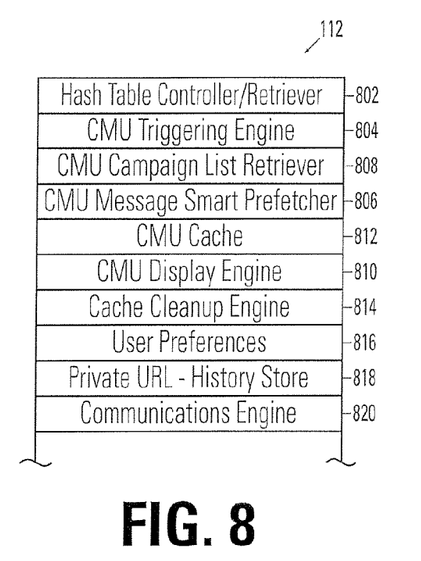
FIG. 8 is a schematic diagram of representative CMU client system in accordance with an embodiment of the present invention.

FIG. 8 is a schematic diagram of representative CMU client system in accordance with an embodiment of the present invention. The CMU client system 112 may comprise a plurality of components including a CMU campaign list retriever 808, a CMU message prefetcher 806, a CMU triggering engine 804, a hash table controller 802, a display engine 810, a cache 812, a cache cleanup engine 814, user preferences 816, private URL history store 818, and communications engine 820.

The CMU campaign list retriever 808 can perform a check for updates from the CMU server system 118. The check can be performed daily, for example, in specific embodiments. In a specific embodiment, the CMU retriever 808 performs the update by sending a request 216 to a CMU server computer 108 via the network 102. The request 216 may contain at least two pieces of information: a unique customer ID of the user (i.e., a user ID) 220 and a current domain being entered by the user (i.e., a machine ID) 222.

The CMU server computer 108 receives the request 216 from the retriever 808 and performs a check to determine if there are any messages pending for the specified domain 222. If it is determined that there are messages associated with the specified domain, then the CMU server computer 108 queries an historical-based targeting database 224 to determine if there are any specific messages pending for this domain 222 for this specific user 220. If there are, then the specific message(s) 226 is returned to the retriever 808 on the user's CMU client computer 104.

The CMU message prefetcher 806 obtains CMU messages when there is available bandwidth. The messages can be stored in the cache 812 for later display. A cache cleanup engine 814 performs cleanup of campaigns that have expired. The CMU triggering engine 804 may examine the user's context (e.g., URL, date/time, etc.) and look for messages stored in the local cache 812 with in-context rules that match. Upon a match being found, the matching message may be presented for display by the display engine 810. The hash table controller 802 performs a check for updates to the hash table. This check can be made daily, for example, in a particular embodiment.

The user preferences 816 include preferences for positioning CMUs for display to the user, and preferences controlling delay time for display of CMUs. The private URL history store 818, keeps a file of URLs visited by users of the client. In specific embodiments, URL history store 818 resides on the client machine to protect privacy of the user. The communications engine 820 controls communications between CMU client 112 and other computers on the network 102.

Figure 9:
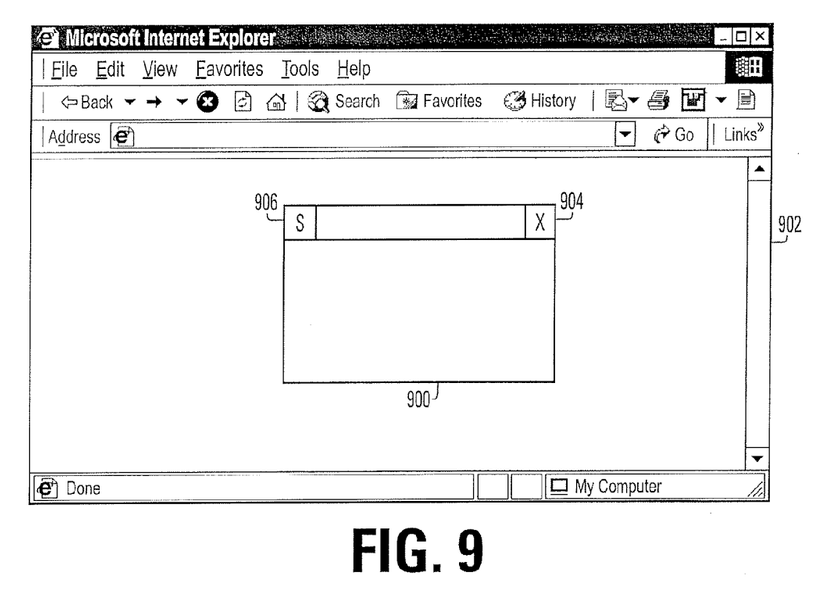
FIG. 9 is a schematic representation of an illustrative display presented on a visual display in accordance with an embodiment of the present invention.

FIG. 9 is a schematic representation of an illustrative display presented on a visual display by the displayer 210 on a user's client computer 104. In one embodiment, the client may present the message in an overlapping window (or frame) such as, for example, a pop-up window 900, that is created by the client for that purpose. In a preferred embodiment, this frame is displayed by an application (i.e., the message client system) running on the client separate from a browser application 902 (e.g., Microsoft's Internet Explorer) running on the client 104. In an embodiment of the present invention, the message window may include one or more of the following attributes: (1) the message window may be re-positionable by the user (e.g., the user may be able to move the message window around within a client area of the browser by drag and drop techniques); (2) the message window may have a close box or button 904 (e.g., such as the type positioned in the upper right hand corner of a Microsoft Windows application window) for selectably closing the message window which may be positioned in the upper right corner; (3) the message window may also include access controls for presenting information about the message, message client system, and/or related user preferences to the user (e.g., such as the "?" button displayed in a Microsoft Windows application window); (4) branding information; (5) tracking the position of the message window relative to the origin of the client area of the browser window so that the message window can maintain its relative position as the user scrolls, resizes or moves the browser window; (6) a save control feature 906 that allows a user to save a presented message for future reference; and/or (7) features for forwarding the message via the network and printing image portion(s) of the message.

As an option, one or more preferences may be available to the user for customizing the behavior of messages presented on their particular client. As an illustrative example, the user may be permitted to set preferences related to the position at which the message window is displayed and the delay (if any) between the completion of the loading of the web page and the display of the message. As a further option, the delay time may also be used to rotate the user through multiple messages per page displayed on the browser application if the user spends sufficient time at those pages displayed on the browser application.

The following examples are provided merely to illustrate representative positioning preference features such as the type described above: the message window position can be configured by the user to be displayed at an upper left corner of the browser window, directly over the browser window, or at a center region of the visual display of the client computer. For illustrative purposes, the following examples are provided merely to illustrate a presentation delay preference feature such as the type as described above: display of the message in the message window immediately after a web page has been completely loaded by the browser application, 1.5 seconds after the web page has been completely loaded by the browser application, and/or a user specified number of seconds after the web page has been loaded.

As new messaging campaigns are entered into the network message system, they are queued up for publishing. The message campaigns in the queue are then processed as follows. First, the domains of the URL triggers in each message are extracted and a domain list is compiled from the extracted domains. Next, the resulting domain list is used to update a client hash table. This trigger information is then sent to the message system server and used by the message system server to respond to client requests for messages. The rule file information is then extracted and sent to the message server system and message content is retrieved from the message system server. This process is repeated until the publishing queue is cleared of pending message/ message campaigns.

Published campaigns are distributed to client machines via the message system server. The message system server may also distribute the following information throughout the network message system: (1) client hash table; (2) rule file lists; (3) rule files; and message related content. In one embodiment, the hash table may be updated each time the publishing process is performed (e.g., if no new message/ domain combinations are added and none are taken away then the hash table can remain unchanged).

A list of rule files are transmitted via the network to the client by the server in response to a request by the client. Client requests may be made by the client machine's user as the user navigates into various domains via the browser application. As part of the request, the server may be provided information such as, for example, the user's current domain and a list of rule files (for the current domain) already residing on the client machine.

Next, the server then finds messages that can be used at the current domain. The file names for each message are added to the file store 306. Each list entry also contains an action code that indicates an action the client should take for that entry. These actions may include, for example: (1) Add—add the specified message to the client's local cache; (2) Delete—remove the specified message from the client's local cache; and (3) Update—update the specified message in the client's cache. Rule files and message related content typically may be delivered to the client using standard web-serving technology.

Figure 10:
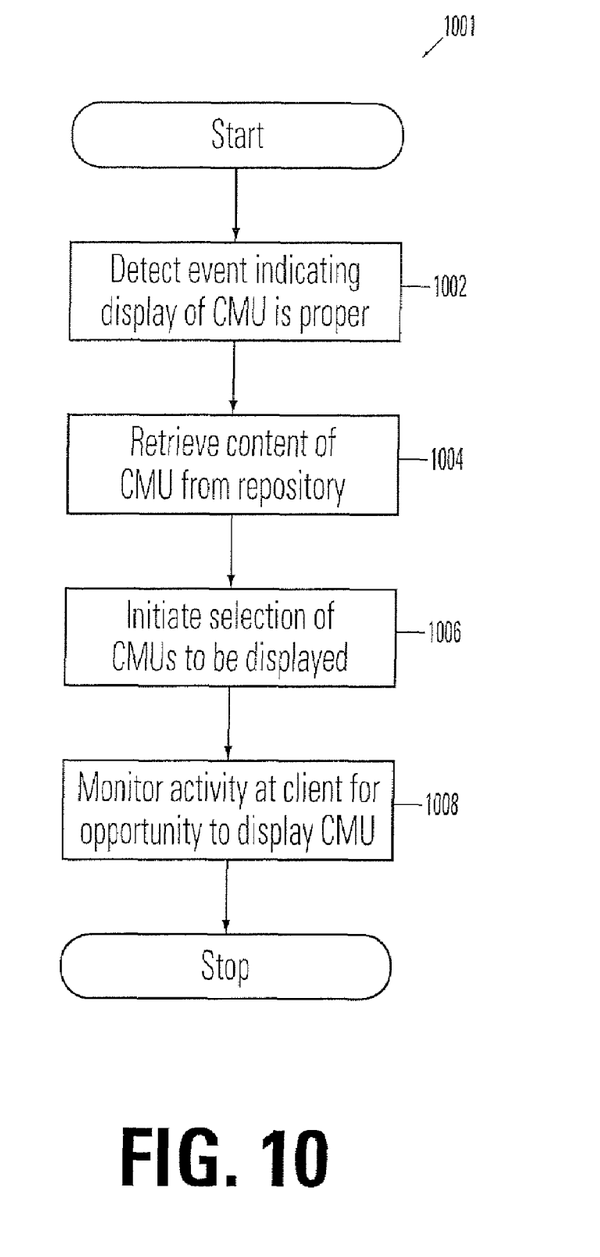
FIG. 10 is a flowchart of a process for presenting information to a user in accordance with an embodiment of the present invention.

FIG. 10 illustrates a flowchart of the representative processing in a specific embodiment of the present invention. As shown, an example process for displaying information to a user comprises: detecting (1002) occurrence of an event indicating a message is to be displayed by a first application on a client; retrieving (1004) content for a first message from a repository at a content server; initiating (1006) selection of one or more messages to be displayed based upon behavioral information collected and analyzed at the client; and monitoring (1008) activity at the client for an opportunity to display a selected message.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for displaying information to a user, comprising:
   providing a client computer system, including a web engine for accessing the internet and a continuous messaging system for controlling the presentation of selected content to the user, both the web engine and the continuous messaging system residing persistently on the client computer system and the continuous messaging system executing independently of the web engine;
   detecting the occurrence of an event indicating a message is to be retrieved by the continuous messaging system;
   the client computer system retrieving one or more messages from a repository at a content server, such messages including displayable content and rules governing the display of the same;
   initiating selection of at least one of the one or more messages to be displayed based upon behavioral information collected and analyzed at the client in conjunction with rules received from the content server;
   monitoring activity, including domain name recognition, at the client for an opportunity to present the selected message; and
   presenting the selected message in accordance with display rules.

2. The method of claim 1, wherein detecting occurrence of an event indicating a message is to be retrieved by a continuous messaging system on a client comprises:

utilizing the continuous messaging system to monitor a web engine on the client in communication with a network for information that satisfies one or more rules of a set of rules.

3. The method of claim 2, wherein retrieving content for one or more messages from a repository at a content server comprises:
collecting information from the web engine utilizing the continuous messaging system, in accordance with at least one rule of the set of rules;
storing at least a portion of the collected information on the client utilizing the continuous messaging system; and
receiving content via the network for presentment by the continuous messaging system based on the portion of the collected information stored on the client.

4. The method of claim 1, further comprising presenting the selected message when the client displays an HTML image that is compatible with the selected message.

5. The method of claim 4, wherein the presenting the selected message when the client displays and HTML image presents a message in a pop-up window.

6. The method of claim 4, wherein the presenting the selected message when the client displays an HTML image presents the message at a user-specified position.

7. The method of claim 4, wherein the presenting the selected message when the client displays an HTML image presents the message at a default position.

8. The method of claim 4, wherein the presenting the selected message when the client displays an HTML image presents the message over an HTML banner.

9. The method of claim 4, further comprising saving the presented message.

10. The method of claim 1, further comprising presenting the selected message when the client displays an HTML image that is compatible with the message;
a domain of a currently displayed web page is included in at least one of a global domain inclusion list and a private domain inclusion list.

11. A computer program product tangibly embodied on a computer readable storage medium, comprising:
code that detects an occurrence of an event indicating a message is to be retrieved by a continuous messaging system residing persistently on a client and executing independently of a client web engine;
code that retrieves content for one or more messages from a repository at a content server, wherein such messages include rules governing the display of the same;
code that initiates selection of at least one of the one or more messages to be displayed based upon behavioral information collected and analyzed at the client in conjunction with rules received from the content server;
code that monitors activity, including domain name recognition, at the client for an opportunity to present the selected message; and
code that presents the selected message display rules contained within the continuous messaging system.

12. The computer program product of claim 11, wherein the code that detects occurrence of an event indicating a message is to be retrieved by a continuous messaging system comprises:
code that utilizes the continuous messaging system to monitor a web engine on the client in communication with a network for information that satisfies one or more rules of a set of rules.

13. The computer program product of claim 12, the code that retrieves the content for one or more messages from a repository at a content server comprises:
code that collects information that satisfies one or more rules of the set of rules from the utilizing the continuous messaging system;
code that stores at least a portion of the collected information on the client utilizing the continuous messaging system; and
code that retrieves content via the network for presentment by the continuous messaging system based on the portion of the collected information stored on the client.

14. The computer program product of claim 11, further comprising:
code that presents the selected message when the client displays an HTML image that is compatible with the message.

15. The computer program product of claim 14, wherein the code that presents the selected message when the client displays an HTML image includes code that presents a message in a pop-up window.

16. The computer program product of claim 14, wherein the code that presents the selected message when the client displays an HTML image includes code that presents the message at a user specified position.

17. The computer program product of claim 14, wherein the code that presents the selected message when the client displays and HTML image includes code that presents the message at a default position.

18. The computer program product of claim 14, wherein the code the presents the selected message when the client displays an HTML image includes code that presents the message over an HTML banner.

19. The computer program product of claim 14, further comprising code that saves the presented message.

20. The computer program product of claim 11, wherein the code that monitors for an opportunity to present the selected message comprises
code that presents a message when:
the client displays an HTML image that is compatible with the message; and
a domain of a currently displayed web page is included in at least one of a global domain inclusion list and a private domain inclusion list.

21. A system for displaying information to a user, comprising:
means for detecting occurrence of an event indicating a message is to be retrieved by a continuous messaging system on a client, such means residing persistently on the client and executing independently of a client web engine;
means residing on the client for retrieving content for one or more messages from a repository at a content server, wherein such messages include rules governing the display of the same;
means for initiating selection of at least one of the one or more messages to be displayed based upon behavioral information collected and analyzed at the client;
means for monitoring activity, including domain name recognition, at the client for an opportunity to present the selected message; and
means for presenting the selected message based on the monitoring when a domain name is not on a URL exclude list.

* * * * *